(No Model.)

R. R. BRIGHT.
DUMB WAITER.

No. 433,931. Patented Aug. 12, 1890.

Attest:
Sidney P. Hollingsworth
Horace A. Dodge.

Inventor:
Richard R. Bright,
by Dodge Sons.
Attorneys.

UNITED STATES PATENT OFFICE.

RICHARD R. BRIGHT, OF INDIANAPOLIS, INDIANA.

DUMB-WAITER.

SPECIFICATION forming part of Letters Patent No. 433,931, dated August 12, 1890.

Application filed February 20, 1890. Serial No. 341,155. (No model.)

*To all whom it may concern:*

Be it known that I, RICHARD R. BRIGHT, a citizen of the United States, residing at Indianapolis, in the county of Marion and State of Indiana, have invented certain new and useful Improvements in Dumb-Waiters, of which the following is a specification.

My invention relates to dumb-waiters, and particularly to locking devices for holding the same in its different positions.

Figure 1:
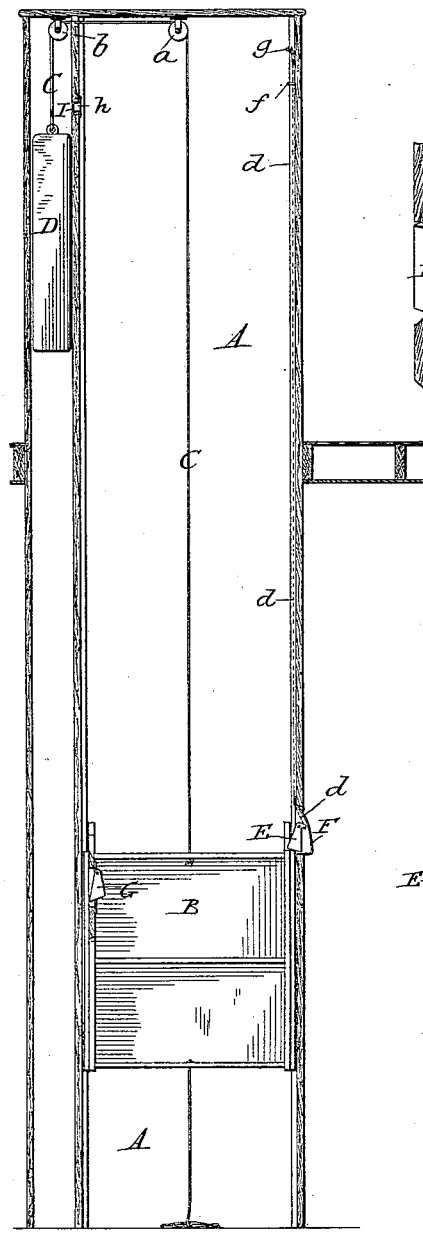
Figure 4:
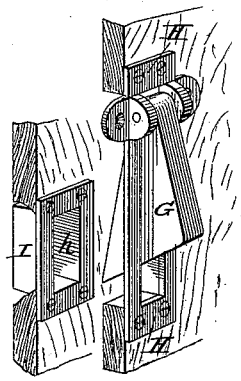
Figure 2:
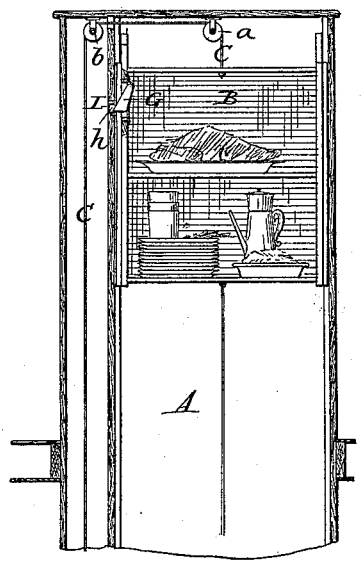
Figure 5:
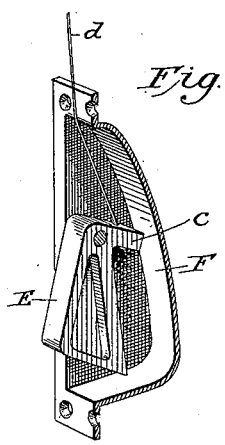
Figure 3:
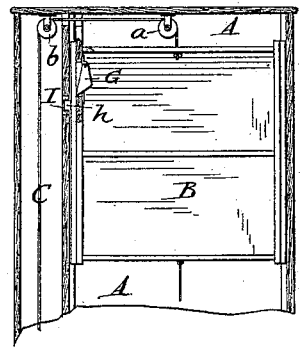

In the accompanying drawings, Figure 1 is a sectional view illustrating the apparatus complete; Fig. 2, a view showing the loaded cupboard or cage in an elevated position and locked against descent; Fig. 3, a view showing the cage or cupboard in an elevated position, but released and free to be drawn down; Fig. 4, a perspective view of the parts of the locking device which serves to hold the cage or cupboard in an elevated position, and Fig. 5 a sectional perspective view of the locking device which holds the cage or cupboard in its lowermost position.

In the practical use of dumb-waiters considerable difficulty or inconvenience is encountered in holding the cage or cupboard at the particular point desired and at the same time permitting it to be released from an upper floor when locked at the lower end of the well or shaft. My invention is designed to obviate this difficulty, and this I do by the construction shown in the drawings, in which—

A indicates the well or shaft in which the cage or cupboard B rises and falls, suitable guides being provided usually. From the top of the cage or cupboard B a rope or cord C passes to the top of the shaft and thence over pulleys $a$ and $b$ to a weight D, which should slightly more than counterbalance the weight of the cage or cupboard B, so that when unloaded said cage will, unless locked to prevent its so doing, rise to the top of the shaft.

E indicates a gravitating dog or catch pivoted at its upper end in a shell or casing F, which is seated in the mortise in the side of the shaft A at such point that when the cage C is lowered to the bottom of the shaft or to its lowest point therein the gravitating dog E shall swing outward to the position indicated in Fig. 1 and lock over the top of the cage or cupboard, thereby preventing the cage from rising.

The dog or catch E is formed with a rearwardly-extending lug or arm $c$, to which is attached a cord or wire $d$, which passes upward at one side of the shaft, and is provided at the top with a ring or button, by which it may be conveniently pulled, so as to raise the arm $c$ and throw backward the body of the dog or catch E, thereby causing its disengagement from over the cage or cupboard B. The cord or wire $d$ at its upper end passes through an eye $f$, which keeps the cord in place and prevents the ring or button from dropping down. If desired, the ring may when not in use be hooked upon a pin or nail $g$.

When it is desired to release the cupboard or cage from the lower floor, the dog or catch E is pressed back by the finger of the attendant, and the cage is thereby freed and allowed to ascend under the influence of the weight D. If, however, the cage is to be released from an upper floor, the cord or wire $d$ is pulled upward, thereby throwing backward the dog or catch E and releasing the cage, as before.

G indicates a second gravitating dog carried in a shell or housing H, which is secured to one side of the cage or cupboard B, an opening being cut through the side of the cage to permit the dog G to swing entirely through the same, and when pressed through the opening to engage in a mortise or recess $h$, which is preferably protected by a casting or shell I. The dog G is so pivoted that it normally swings inward into the cage or cupboard B to the position indicated in Figs. 1 and 3, but may be pressed outward to engage in the recess or mortise $h$ in the manner indicated in Fig. 2.

Assuming now that the cage be first brought to the position indicated in Fig. 1 and locked by the dog E, it may be loaded with entire safety, because free from liability to become released and ascend under the action of weight D. When loaded, however, the cage may be released by pressing back the dog or catch E, or, as will ordinarily be preferred, the proper signal will be given to the person on the upper floor, who will then pull the cord or wire $d$, and thereby retract the locking dog or catch E, aiding the ascent of the cage B by drawing upward on the rope C. As the cage or cupboard rises to the desired point, the person in attendance at that point presses outward upon the locking-dog G and causes the same to enter the recess or mortise $h$, whereupon the weight of the loaded cage or cupboard being greater than that of weight D, tends to cause a downward movement of the cage, and thereby holds the locking-dog G in engagement with the lower wall of the recess $h$. This engagement will continue so long as the weight of the cage and its contents exceeds that of the counter-balance D; but when the load is removed from the cage the preponderance of the counter-balance D will cause it to ascend slightly until it comes in contact with the top of the well or shaft, or with stops placed to limit its rise, and in doing so will free the dog G and permit it to swing inward away from the recess $h$. The cage will then be free to be drawn down, as usual.

It will of course be understood that, instead of making a recess in the side of the shaft, a projecting block or clip may be applied thereto, provided sufficient room be left for it between the wall of the shaft and the side of the cage or cupboard.

I am aware that gravitating catches have been applied to the upper sashes of windows to hold them against descent, and that in some cases the arrangement has been such as to prevent the raising of the lower sash without first moving back the catch. I am also aware that a gravitating catch of peculiar construction has been applied to the cage or cupboard of a dumb-waiter to hold it in an elevated position; but I am not aware that any one has before proposed the combination, with such cage or cupboard, of a gravitating dog or catch to hold the same against ascent, nor that provision has been made for releasing such dog or catch from another story; nor am I aware that a gravitating dog or catch has ever before been arranged to work through the side or wall of a dumb-waiter cupboard or cage, where it is always and readily accessible to any one placing things within or removing them from such cupboard.

Having thus described my invention, what I claim is—

1. In combination with shaft A, cage or cupboard B, and a counter-weight connected with and adapted to elevate the cage when the latter is released, gravitating dog E, pivoted to the wall of the shaft and adapted to swing over and into engagement with the cage as the latter passes below said catch, whereby the counter-weight is prevented from elevating the cage while the load is being placed upon or removed from the same.

2. In combination with a cage or cupboard B, a counter-weight connected with and adapted to elevate said cage, a locking-dog E, adapted to engage with the cage and prevent its elevation, said dog being provided with an arm $c$, and a cord or wire extending from said arm to an upper story and serving to disengage the dog from the cage or cupboard.

3. In combination with shaft A, having a recess or locking-shoulder, a cage or cupboard B, and a gravitating dog G, extending through a wall of the cage adapted to swing normally inward away from the recess or locking-shoulder, but accessible from within the cage and capable of being manually pressed outward into engagement with the locking-shoulder or recess.

4. In combination with shaft A, a cage or cupboard B, mounted therein, rope C, a weight D, connected with the cage and serving to elevate the same, gravitating dog E, adapted to engage with the cage and prevent its ascent, and gravitating dog G, carried by the cage and adapted to engage with the side of the well or shaft and prevent the descent of said cage.

5. In combination with shaft A, cage or cupboard B, rope C, and weight D, adapted to elevate the cage, a gravitating dog G, pivotally attached to said cage and adapted to engage with a locking-shoulder in the shaft when pressed outward, whereby the cage may be locked against descent when laden sufficiently to overcome the weight D, but is automatically unlocked when the load is reduced so as to permit the weight to lift the cage above its locked position and allow the locking-dog to swing inward away from the locking-shoulder.

In witness whereof I hereunto set my hand in the presence of two witnesses.

RICHARD R. BRIGHT.

Witnesses:
C. S. DRURY,
W. W. DODGE.